United States Patent
Quinn (10) Patent No.: US 8,250,120 B2
(45) Date of Patent: Aug. 21, 2012

(54) METHODS AND SYSTEMS FOR MERGING MEDIA FILES FROM MULTIPLE MEDIA DEVICES

(75) Inventor: Michael J. Quinn, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 673 days.

(21) Appl. No.: 12/391,444

(22) Filed: Feb. 24, 2009

(65) Prior Publication Data

US 2010/0228803 A1  Sep. 9, 2010

(51) Int. Cl.
*G06F 7/00* (2006.01)
*G06F 17/30* (2006.01)

(52) U.S. Cl. .......................... 707/808; 707/913; 707/975

(58) Field of Classification Search .................. 707/808, 707/913, 975
See application file for complete search history.

(56) References Cited

U.S. PATENT DOCUMENTS

| | | | |
|---|---|---|---|
| 7,461,058 B1 * | 12/2008 | Rauser et al. ........................... 1/1 |
| 7,984,039 B2 * | 7/2011 | Carmel et al. ................. 707/713 |
| 2004/0002310 A1 * | 1/2004 | Herley et al. .............. 455/179.1 |
| 2004/0210533 A1 * | 10/2004 | Picker et al. ..................... 705/51 |
| 2005/0015405 A1 * | 1/2005 | Plastina et al. ............. 707/104.1 |
| 2005/0015713 A1 * | 1/2005 | Plastina et al. ............. 715/500.1 |
| 2006/0233063 A1 * | 10/2006 | Inoue et al. ................. 369/30.03 |
| 2007/0016574 A1 * | 1/2007 | Carmel et al. ..................... 707/5 |
| 2007/0118873 A1 * | 5/2007 | Houh et al. .................... 725/136 |
| 2008/0091717 A1 * | 4/2008 | Garbow et al. ............ 707/104.1 |
| 2008/0114764 A1 * | 5/2008 | Choi .................................. 707/7 |
| 2008/0257134 A1 * | 10/2008 | Oppenheimer ................ 84/609 |
| 2009/0055390 A1 * | 2/2009 | Maeda et al. ..................... 707/5 |
| 2009/0077141 A1 * | 3/2009 | Hady et al. ..................... 707/204 |
| 2009/0210415 A1 * | 8/2009 | Martin et al. ..................... 707/5 |
| 2010/0114986 A1 * | 5/2010 | Mercer et al. ................. 707/803 |

* cited by examiner

*Primary Examiner* — Robert Timblin
*Assistant Examiner* — Jessica N Le
(74) *Attorney, Agent, or Firm* — Ingrassia Fisher & Lorenz P.C.

(57) ABSTRACT

A method for merging media includes the steps of obtaining a first input from a first media device, the first input comprising first data corresponding to properties of one or more first media files, obtaining a second input from a second media device, the second input comprising second data corresponding to properties of one or more second media files, generating a merged list comprising one or more first selected media files of the first media files sharing a common property with at least one of the second media files and second selected media files of the second media files sharing the common property, and causing execution of one of the first selected media files, one of the second selected media files, or both.

14 Claims, 4 Drawing Sheets

METHODS AND SYSTEMS FOR MERGING MEDIA FILES FROM MULTIPLE MEDIA DEVICES

TECHNICAL FIELD

The present invention generally relates to the field of entertainment media and, more specifically, to methods and systems for merging media from multiple media devices.

BACKGROUND OF THE INVENTION

In various circumstances, it may be desirable to merge media from multiple media devices. For example, when multiple individuals are together, it is often difficult to provide entertainment that satisfies the preferences of each of the individuals present. By way of further example, when members of a family or another group of individuals are riding together in a vehicle, it may be difficult to provide musical or other entertainment satisfying the tastes of each member of the family or group. It can be further difficult to provide such entertainment continuously without active decision making, voting, or debating among various members of the family or group.

Accordingly, it is desirable to provide an improved method for merging media from multiple media devices. It is also desirable to provide an improved program product for such merging of media. It is further desirable to provide an improved system for such merging of media. Furthermore, other desirable features and characteristics of the present invention will be apparent from the subsequent detailed description and the appended claims, taken in conjunction with the accompanying drawings and the foregoing technical field and background.

SUMMARY OF THE INVENTION

In accordance with an exemplary embodiment of the present invention, a method for merging media is provided. The method comprises the steps of obtaining a first input from a first media device, the first input comprising first data corresponding to properties of one or more first media files, obtaining a second input from a second media device, the second input comprising second data corresponding to properties of one or more second media files, generating a merged list comprising one or more first selected media files of the first media files sharing a common property with at least one of the second media files and one or more second selected media files of the second media files sharing the common property, and causing execution of one of the first selected media files, one of the second selected media files, or both.

In accordance with another exemplary embodiment of the present invention, a program product for merging media is provided. The program product comprises a program and a computer-readable signal-bearing media. The program is configured to at least facilitate obtaining a first input from a first media device, the first input comprising first data corresponding to properties of one or more first media files, obtaining a second input from a second media device, the second input comprising second data corresponding to properties of one or more second media files, generating a merged list comprising one or more first selected media files of the first media files sharing a common property with at least one of the second media files and one or more second selected media files of the second media files sharing the common property, and causing execution of one of the first selected media files, one of the second selected media files, or both. The computer-readable signal-bearing media bears the program.

In accordance with a further exemplary embodiment of the present invention, a system for merging media is provided. The system comprises an input port and a processor. The input port is configured to at least facilitate obtaining a first input from a first media device, the first input comprising first data corresponding to properties of one or more first media files and obtaining a second input from a second media device, the second input comprising second data corresponding to properties of one or more second media files. The processor is coupled to the input port. The processor is configured to at least facilitate generating a merged list comprising one or more first selected media files of the first media files sharing a common property with at least one of the second media files and one or more second selected media files of the second media files sharing the common property, and causing execution of one of the first selected media files, one of the second selected media files, or both.

BRIEF DESCRIPTION OF THE DRAWINGS

The present invention will hereinafter be described in conjunction with the following drawing figures, wherein like numerals denote like elements, and wherein.

DETAILED DESCRIPTION OF THE INVENTION

The following detailed description is merely exemplary in nature, and is not intended to limit the invention or the application and uses of the invention. Furthermore, there is no intention to be bound by any expressed or implied theory presented in the preceding technical field, background, brief summary or the following detailed description.

Figure 1:
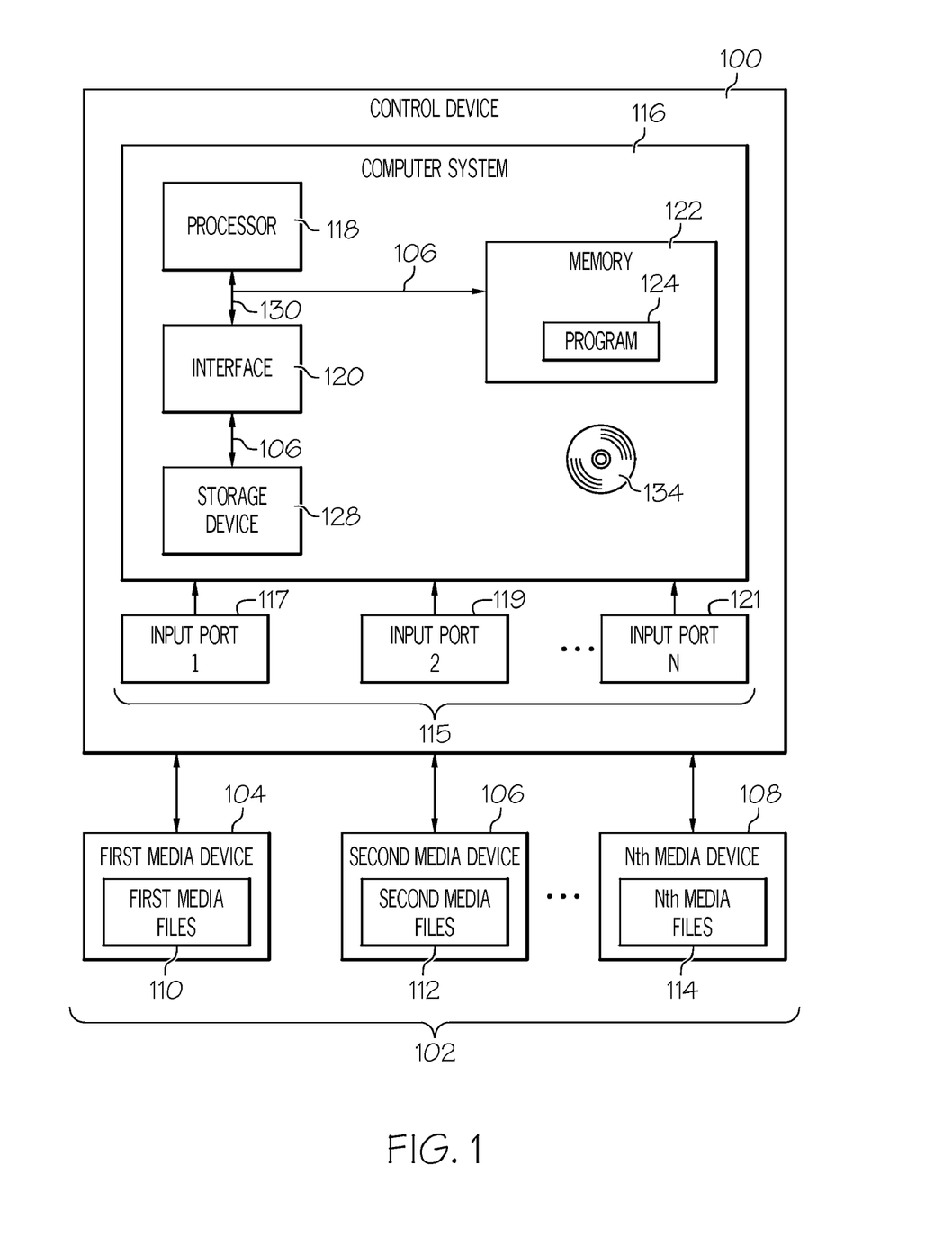
FIG. 1 is a functional block diagram of a control device for merging media from multiple media devices, for example for providing entertainment for occupants of a vehicle, in accordance with an exemplary embodiment of the present invention.

FIG. 1 is a functional block diagram of a control device 100 for merging media, for example in providing entertainment for occupants of a vehicle, in accordance with an exemplary embodiment of the present invention. The control device 100 is coupled to a plurality of media devices 102, depicted in FIG. 1 as a first media device 104 having first media files 110 stored therein, a second media device 106 having second media files 112 stored therein, and an nth media device 108 having nth media files 114 stored therein. The control device 100 may similarly be coupled to any number of other additional media devices 102 with additional associated media files.

In one exemplary embodiment, each media device 102 is representative of a different occupant, for example of a vehicle. In this exemplary embodiment, the control device 100 provides entertainment for the occupants based upon one or more common preferences of the occupants as determined from the media devices 102.

Also in one exemplary embodiment, each media device 102 comprises an mp3 player of a different occupant with media files of entertainment selections (e.g., songs, movies, audiobooks, or other entertainment selections) and metadata or other information representative of the entertainment selections. In another exemplary embodiment, each media device 102 comprises a storage drive of a different occupant with media files of entertainment selections (e.g., songs, movies, audiobooks, or other entertainment selections) and metadata or other information representative of the entertainment selections. The type and number of media devices 102 and associated media files may vary in different embodiments of the invention. The media devices 102 may comprise, for example, mp3 players, storage drives, and/or any one or more of a number of other different types of devices.

The control device 100 includes a plurality of input ports 115 and a computer system 116. As depicted in FIG. 1, the plurality of input ports 115 includes a first input port 117, a second input port 119, and an nth input port 121. The plurality of input ports 115 may also include any number of other additional input ports 115. Each input port 115 represents a means for connecting a media device 102 to the computer system 116. For example, in one exemplary embodiment, each input port 115 comprises a USB port. In another exemplary embodiment, each input port 115 comprises an Ethernet port. In various other embodiments, the input ports 115 comprise one or more other different types of ports or connections. In various other embodiments, the input ports 115 may comprise one or more different types of wireless media.

In a preferred embodiment, each input port 115 is coupled to a corresponding media device 102 and is configured to receive input values therefrom, supply the input values to the computer system 116, and supply instructions to the media devices 102 from the computer system 116. For example, the first input port 117 is coupled to the first media device 104 and is configured to obtain a first input therefrom, supply the first input to the computer system 116, and supply instructions from the computer system 116 to the first media device 104. The first input comprises first data identifying properties, preferably including metadata or other information pertaining to the first media files 110. Similarly, the second input port 119 is coupled to the second media device 106 and is configured to obtain a second input therefrom, supply the second input to the computer system 116, and supply instructions from the computer system 116 to the second media device 106. The second input comprises second data identifying properties, preferably including metadata or other information pertaining to the second media files 112. Likewise, the nth input port 121 is coupled to the nth media device 108 and is configured to obtain an nth input therefrom, supply the nth input to the computer system 116, and supply instructions from the computer system 116 to the nth media device 108. The nth input comprises nth data identifying properties, preferably including metadata or other information pertaining to the nth media files 114.

Also in one preferred embodiment, the first media files 110, the second media files 112, and the nth media files 114 comprise entertainment selections (e.g., songs, movies, audiobooks, or other entertainment selections) and metadata or other information representative thereof from the respective first media device 104, second media device 106, and nth media device 108. Each media device 102 is preferably representative of a different occupant, for example of a vehicle.

In one exemplary embodiment, each media device 102 comprises an mp3 player of a different occupant storing media files of entertainment selections of the occupant and metadata or other information representative of the entertainment selections. In another exemplary embodiment, each media device 102 comprises a storage drive of a different occupant storing media files of entertainment selections of the occupant and metadata or other information representative of the entertainment selections. The type and number of media devices 102 and associated media files may vary in different embodiments of the invention.

The computer system 116 is coupled to the media devices 102 via the input ports 115 described above. The computer system 116 receives the first input from the first media device 104 via the first input port 117, the second input from the second media device 106 via the second input port 119, and the nth input from the nth media device 108 via the nth input port 121. In addition, the computer system 116 provides instructions to the first media device 104 via the first input port 117, to the second media device 106 via the second input port 119, and to the nth media device 108 via the nth input port 121. Specifically, in one preferred embodiment, the computer system 116 receives information as to media files representing entertainment selections of various occupants, selects those media files representing common preferences of each of the occupants, and provides instructions to respective media devices 102 to execute those selected media files stored on the respective media devices 102, in accordance with the steps of the process 200 depicted in FIG. 2 and described further below in connection therewith.

The computer system comprises a processor 118, a memory 122, a computer bus 130, an interface 120, and a storage device 128. In addition, while the input ports 115 are depicted outside the computer system 116, it will be appreciated that one or more of the input ports 115 may be a part of the computer system 116 in various embodiments.

The processor 118 performs the computation and control functions of the computer system 116 or portions thereof, and may comprise any type of processor or multiple processors, single integrated circuits such as a microprocessor, or any suitable number of integrated circuit devices and/or circuit boards working in cooperation to accomplish the functions of a processing unit. During operation, the processor 118 executes one or more programs 124 preferably stored within the memory 122 and, as such, controls the general operation of the computer system 116.

In a preferred embodiment, the processor 118 receives the above-described first input from the first media device 104 via the first input port 117, the second input from the second media device 106 via the second input port 119, and the nth input from the nth media device 108 via the nth input port 121. Also in a preferred embodiment, the processor 118 provides instructions to the first media device 104 via the first input port 117, to the second media device 106 via the second input port 119, and to the nth media device 108 via the nth input port 121. Specifically, in one preferred embodiment, the processor 118 (i) receives information as to media files representing entertainment selections from the media devices of various occupants, and therefore representing preferences of the occupants, (ii) selects those media files representing common preferences of each of the occupants, and provides instructions to respective media devices 102 to execute those selected media files stored on the respective media devices 102 (or otherwise causes execution of the selected media files, for example via a media player included within or coupled to the computer system 116 and the processor 118 thereof). In so doing, the processor 118 preferably executes one or more programs 124 stored in the memory 122 in conducting the steps of the process 200 depicted in FIG. 2 and described further below in connection therewith.

As referenced above, the memory 122 stores a program or programs 124 that execute one or more embodiments of processes such as the process 200 described below in connection with FIG. 2 and/or various steps thereof and/or other processes, such as those described elsewhere herein. The memory 122 can be any type of suitable memory. This would include the various types of dynamic random access memory (DRAM) such as SDRAM, the various types of static RAM (SRAM), and the various types of non-volatile memory (PROM, EPROM, and flash). It should be understood that the memory 122 may be a single type of memory component, or it may be composed of many different types of memory components. In addition, the memory 122 and the processor 118 may be distributed across several different computers that collectively comprise the computer system 116. For example, a portion of the memory 122 may reside on a computer within a particular apparatus or process, and another portion may reside on a remote computer.

The computer bus 130 serves to transmit programs, data, status and other information or signals between the various components of the computer system 116. The computer bus 130 can be any suitable physical or logical means of connecting computer systems and components. This includes, but is not limited to, direct hard-wired connections, fiber optics, infrared and wireless bus technologies.

The interface 120 allows communication to the computer system 116, for example from a vehicle occupant, a system operator, and/or another computer system, and can be implemented using any suitable method and apparatus. In certain embodiments, the interface 120 provides the information from the media devices 102 and/or the input ports 115 to the processor 118 and supplies instructions from the processor 118 directly or indirectly to the media devices 102 and/or the input ports 115. The interface 120 can include one or more network interfaces to communicate within or to other systems or components, one or more terminal interfaces to communicate with technicians and/or occupants of the vehicle, and/or one or more storage interfaces to connect to storage apparatuses such as the storage device 128.

The storage device 128 can be any suitable type of storage apparatus, including direct access storage devices such as hard disk drives, flash systems, floppy disk drives and optical disk drives. In one exemplary embodiment, the storage device 128 is a program product from which memory 122 can receive a program 124 that executes one or more embodiments of the process 200 of FIG. 2 and/or steps thereof as described in greater detail further below. In one preferred embodiment, such a program product can be implemented as part of, inserted into, or otherwise coupled to the computer system 116 and/or the control device 100. As shown in FIG. 1, the storage device 128 can comprise a disk drive device that uses disks 134 to store data. As one exemplary implementation, the computer system 116 may also utilize an Internet website, for example for providing or maintaining data or performing operations thereon.

It will be appreciated that while this exemplary embodiment is described in the context of a fully functioning computer system, those skilled in the art will recognize that the mechanisms of the present invention are capable of being distributed as a program product in a variety of forms, and that the present invention applies equally regardless of the particular type of computer-readable signal bearing media used to carry out the distribution. Examples of signal bearing media include: recordable media such as floppy disks, hard drives, memory cards and optical disks (e.g., disk 134), and transmission media such as digital and analog communication links. It will similarly be appreciated that the computer system 116 may also otherwise differ from the embodiment depicted in FIG. 1, for example in that the computer system 116 may be coupled to or may otherwise utilize one or more remote computer systems and/or other control systems.

Figure 2:
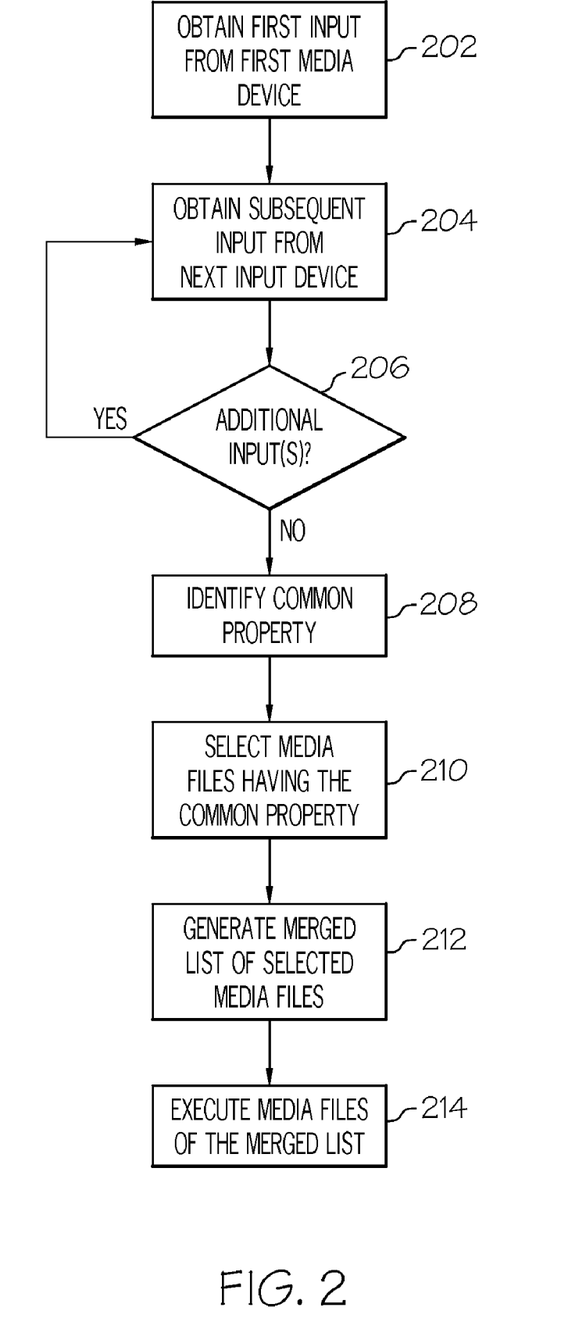
FIG. 2 is a flowchart of a process for merging media from multiple media devices, for example for providing entertainment for occupants of a vehicle, and that can be implemented in connection with the control device of FIG. 1, in accordance with an exemplary embodiment of the present invention.

FIG. 2 is a flowchart of a process 200 for merging media from multiple media devices, for example in providing entertainment for occupants, such as occupants of a vehicle, in accordance with an exemplary embodiment of the present invention. For example, the process 200 can be used to merge media from media devices of occupants of a vehicle so that only media corresponding to a preference common to all or a majority of the occupants. In a preferred embodiment, the process 200 can be implemented in connection with the control device 100 of FIG. 1 and/or through program products that can be utilized in connection therewith. However, it will be appreciated that in various embodiments the process 200 may also be utilized in connection with any number of different types of systems and/or other devices.

As depicted in FIG. 2, the process 200 includes the step of obtaining a first input from a first media device (step 202). In a preferred embodiment, the first input is obtained by the processor 118 of FIG. 1 from the first media device 104 of FIG. 1 via the first input port 117 of FIG. 1. Also in one preferred embodiment, the first input comprises first data identifying properties of the first media files 110 of FIG. 1. Specifically, the first data preferably represents metadata or other information pertaining to the first media files 110 of FIG. 1, for example the for example the titles, genres, authors, performers, length, musical instruments used, other characteristics, or the like of entertainment selections (e.g., songs, movies, audiobooks, or other entertainment selections) represented in the first media files 110. In one preferred embodiment, the first input represents entertainment preferences of a first occupant, for example of a vehicle.

In addition, subsequent input is obtained from a next media device (step 204). In a preferred embodiment, in a first iteration of step 204, the subsequent input comprises a second input obtained by the processor 118 of FIG. 1 from the second media device 106 of FIG. 1 via the second input port 119 of FIG. 1. Also in one preferred embodiment, the second input comprises second data identifying properties of the second media files 112 of FIG. 1. Specifically, the second data preferably represents metadata or other information pertaining to the second media files 112 of FIG. 1, for example the for example the titles, genres, authors, performers, length, musical instruments used, other characteristics, or the like of entertainment selections (e.g., songs, movies, audiobooks, or other entertainment selections) represented in the second media files 112. In one preferred embodiment, the second input represents entertainment preferences of a second occupant, for example of a vehicle.

A determination is then made as to whether there are any additional inputs (step 206). In a preferred embodiment, this determination is made by the processor 118 of FIG. 1. If it is determined in step 206 that there are any additional inputs, then step 204 is repeated for another subsequent input. For example, in a preferred embodiment, an nth input is obtained from an nth media device by the processor 118 of FIG. 1 from the nth media device 108 of FIG. 1 via the nth input port 121 of FIG. 1. Also in one preferred embodiment, the nth input comprises nth data identifying properties of the nth media files 114 of FIG. 1. Specifically, the nth data preferably represents metadata or other information pertaining to the nth media files 114 of FIG. 1, for example the for example the titles, genres, authors, performers, length, musical instruments used, other characteristics, or the like of entertainment selections (e.g., songs, movies, audiobooks, or other entertainment selections) represented in the nth media files 114. In one preferred embodiment, the nth input represents entertainment preferences of an nth occupant, for example of a vehicle.

Step 204 repeats until there is a determination in an iteration of step 206 that there are no additional inputs. Once there is a determination made that there are no additional input, the process proceeds instead to step 208, as described below.

The process continues with the identification of a common property of the media files (step 208). The common property represents a property that is present in at least in one media file of each of the media devices for which inputs were obtained in steps 202 and 204 above. In one preferred embodiment, the common property comprises a genre to which at least one media file or entertainment selection of each of the media devices belongs. In another preferred embodiment, the common property comprises an artist, an actor, or a production company associated with at least one media file or entertainment selection of each of (or, in certain embodiments, a majority of, or some other percentage of) the media devices. In certain embodiments, multiple common properties may be used. Various other criteria may also be used for the common property or common properties. The identification of the one or more common properties is preferably conducted by the processor 118 of FIG. 1.

Certain media files are selected as having the common property (step 210). Specifically, individual media files from those obtained in steps 202 and 204 above (for example, individual media files from the first media files 110, the second media files 112, and the nth media files 114 of FIG. 1) are so selected if they are associated with the common property identified in step 208. A merged list is then generated (step 212) to comprise each of the selected media files, that is, each of the media files from steps 202 and 204 above that are associated with the common property. For example, in one preferred embodiment, the merged list comprises media files from the media devices representing entertainment selections belonging to a common genre. In another preferred embodiment, the merged list comprises media files from each of the media devices representing entertainment selections having a common actor, a common performer, and/or a common production company, and/or that include one or more other common properties. The processor 118 of FIG. 1 preferable selects those media files having the common property and generates the merged list of the selected media files.

The process continues with the execution of one or more media files from the merged list (step 214). In one preferred embodiment, the processor 118 of FIG. 1 instructs one of the media devices 102 of FIG. 1 to execute a media file stored within such media device that belongs to the merged list. In certain preferred embodiments, the processor 118 of FIG. 1 instructs each of the media devices 102 of FIG. 1 to execute various media files stored within each such media device that belong to the merged list. In one exemplary embodiment, the processor 118 causes the media devices to play one or more entertainment selections via execution of one or more media files stored on the media devices that represent a common interest of each of a plurality of occupants, for example of a vehicle. In another exemplary embodiment, the processor 118 causes one or more non-depicted media players (for example, a DVD player) to play one or more entertainment selections via execution of one or more media files stored on the media devices that represent a common interest of each of a plurality of occupants, for example of a vehicle.

It will be appreciated that certain steps of the process 200 may vary from those depicted in FIG. 2 and described herein. It will be similarly appreciated that certain steps of the process 200 may be performed simultaneously and/or in an order different from that depicted in FIG. 2 and described herein.

Figure 3:
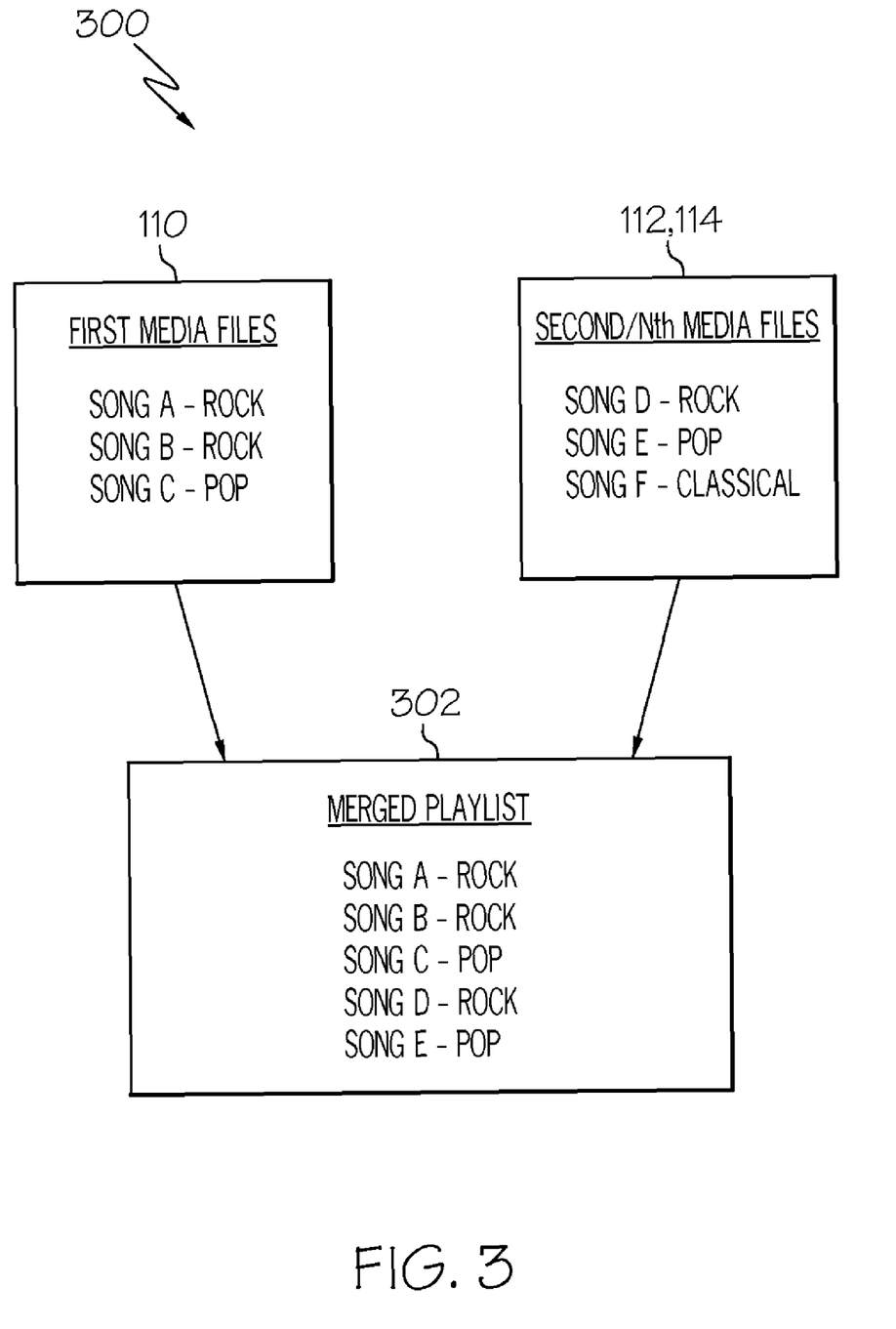
FIG. 3 is a functional block diagram of exemplary media files from two exemplary media devices, for example of two different occupants of a vehicle, and a merged list generated therefrom, that can be utilized in connection with the process of FIG. 2 and the control device of FIG. 1, in accordance with an exemplary embodiment of the present invention.

FIG. 3 is a functional block diagram of exemplary media files from two exemplary media devices, for example of two different occupants of a vehicle, and a merged list generated therefrom, that can be utilized in connection with the process 200 of FIG. 2 and the control device 100 of FIG. 1, in accordance with an exemplary embodiment of the present invention. Specifically, FIG. 3 depicts exemplary content of the first media files and metadata 110 and the second media files and metadata 112 of FIG. 1, along with a merged playlist 302 generated therefrom. FIG. 3 represents an example in which two media devices are utilized, and thus in which the second media file 112 corresponds to the "nth" media file 114 (i.e., in which "n"=2).

In the depicted example, the first media files 110 include three songs, namely Song A, Song B, and Song C. Songs A and B belong to a rock genre, and Song C belongs to a pop genre. Also in the depicted embodiment, the second media files 112 include three songs, namely Song D, Song E, and Song F. Song D belongs to the rock genre, Song E belongs to the pop genre, and Song F belongs to a classical genre.

In this example, the merged playlist 302 includes five selected songs, namely Song A, Song B, Song C, Song D, and Song E. These five selected songs belong to two common genres, namely the rock genre and the pop genre common to both media devices. Specifically, there is at least one song from each of the first media files 110 and the second media files 112 that belong to these genres. Accordingly, in one preferred embodiment, when the merged playlist 302 is executed, each of the songs played is from a genre satisfying a preference of each of the first and second occupants, for example of a vehicle.

Figure 4:
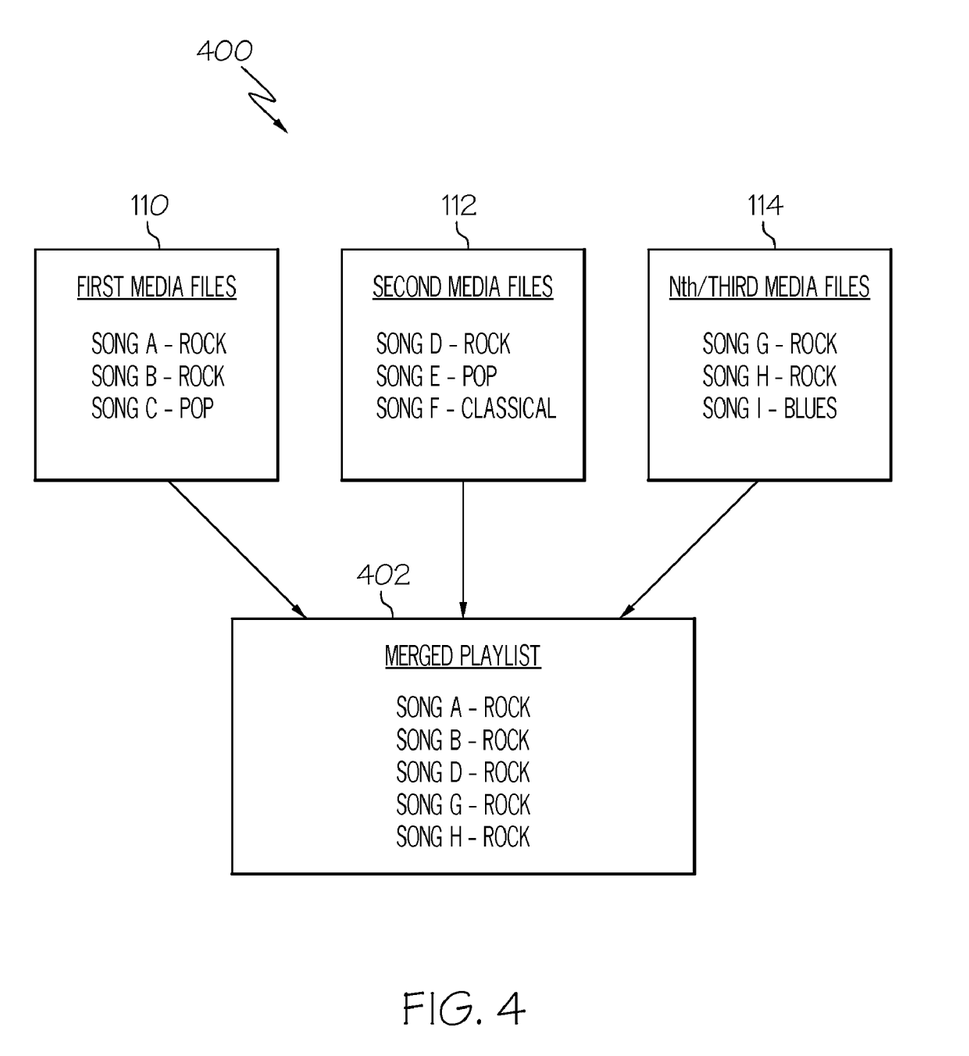
FIG. 4 is a functional block diagram of exemplary media files from three exemplary media devices, for example of three different occupants of a vehicle, and a merged list generated therefrom, that can be utilized in connection with the process of FIG. 2 and the control device of FIG. 1, in accordance with an exemplary embodiment of the present invention.

FIG. 4 is a functional block diagram of exemplary media files from three exemplary media devices, for example of three different occupants of a vehicle, and a merged list generated therefrom, that can be utilized in connection with the process 200 of FIG. 2 and the control device 100 of FIG. 1, in accordance with an exemplary embodiment of the present invention. Specifically, FIG. 4 depicts exemplary content of the first media files 110, the second media files 112, and the nth media files 114 of FIG. 1, along with a merged playlist 402 generated therefrom. FIG. 4 represents an example in which three media devices are utilized, and thus in which the nth media file 114 corresponds to a third media file 114 (i.e., in which "n"=3).

In the depicted example, the first media files 110 include three songs, namely Song A, Song B, and Song C, similar to the example of FIG. 3. As with the example of FIG. 3, Songs A and B belong to a rock genre, and Song C belongs to a pop genre. Also in the depicted embodiment, the second media files 112 include three songs, namely Song D, Song E, and Song F, similar to FIG. 3. Song D belongs to the rock genre, Song E belongs to the pop genre, and Song F belongs to a classical genre, also similar to FIG. 3. In addition, in FIG. 4, the third media files 114 include three songs, namely Song G, Song H, and Song I. Songs G and H belong to the rock genre, and Song I belongs to a blues genre.

In this example, the merged playlist 402 includes five selected songs, namely Song A, Song B, Song D, Song G, and Song H. These five selected songs belong to one common genre, namely the rock genre. Specifically, there is at least one song from each of the first media files 110, the second media files 112, and the third media files 114 belonging to the rock genre. Accordingly, in one preferred embodiment, when the merged playlist 402 is executed, each of the songs played is from a genre satisfying a preference of each of the first, second, and third occupants, for example of a vehicle.

While FIGS. 3 and 4 depict examples involving two and three media devices, respectively, it will be appreciated that the number of media devices may vary in different embodiments of the present invention. It will similarly be appreciated that various different types of media players, input ports, and/or media files may be utilized, among other possible variations to the methods, program products, and systems provided herein.

Accordingly, improved methods, program products, and systems are provided for merging media from multiple media devices, for example in providing entertainment to a group of occupants of a vehicle. The improved methods, programs products, and systems merge media based on characteristics common to selections from each of the media devices. In so doing, entertainment can be provided, for example, that satisfies the preferences of each of a plurality of occupants, for example of a vehicle. In addition, by way of further example, the improved methods, program products, and systems are able to provide such entertainment continuously without active decision making, voting, or debating among the occupants.

It will be appreciated that the methods, program products, devices, and systems may and/or steps and/or components thereof may vary from those presented in the Figures and described herein. In addition, while the methods, program products, and systems were at times described above in connection with vehicles, such as automobiles, it will be appreciated that the methods, program products, and systems may be utilized in any number of different applications.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method comprising:
  obtaining a first input from a first media device of a first user, the first media device comprising a first portable electronic device belong to a first occupant of a plurality of occupants of a vehicle, the first input comprising first data corresponding to properties of one or more first media files, wherein the obtaining of the first input comprises obtaining metadata representative of a first plurality of entertainment selections from the first media device via a first physical input connection onboard the vehicle;
  obtaining a second input from a second media device of a second user, the second media device comprising a second portable electronic device belong to a second occupant of the plurality of occupants of the vehicle, the second input comprising second data corresponding to properties of one or more second media files, wherein the obtaining of the second input comprises obtaining metadata representative of a second plurality of entertainment selections from the second media device via a second physical input connection onboard the vehicle;
  generating, via a processor, a list comprising:
    one or more first selected media files of the first media files from the first media device sharing a common property with at least one of the second media files from the second media device; and
    one or more second selected media files of the second media files from the second media device sharing the common property, such that the list comprises a selected plurality of files comprising the first selected media files and the second selected media files,
    wherein the list comprises a third plurality of entertainment selections generated using the metadata representative of the first plurality of entertainment selections and the metadata representative of the second plurality of entertainment selections; and
  causing execution of one of the selected plurality of media files via a processor.

2. The method of claim 1, wherein the causing execution of one of the selected plurality of media files comprises:
  causing the first media device to execute one of the selected plurality of media files.

3. The method of claim 1, further comprising:
  obtaining one or more additional inputs from one or more additional media devices, the one or more additional inputs comprising additional data corresponding to properties of one or more additional media files;
  generating the list so that the selected plurality of media files comprises:
    one or more first selected media files of the first media files sharing the common property with at least one of the second media files and at least one of the additional media files of each of the additional media devices;
    one or more second selected media files of the second media files sharing the common property; and
    one or more additional selected media files of each of the additional media files sharing the common property; and
  causing one of the following:
    execution of one of the first selected media files;
    execution of one of the second selected media files; or
    execution of one of the additional selected media files.

4. The method of claim 1, wherein:
  obtaining the first input comprises obtaining preferences of a first occupant of a plurality of occupants of a vehicle via the first media device onboard the vehicle;
  obtaining the second input comprises obtaining preferences of a second occupant of the plurality of occupants via the second media device onboard the vehicle; and
  generating the list comprises generating the list to be compatible with the preferences of the first occupant and the preferences of the second occupant.

5. The method of claim 1, wherein selecting the third plurality of entertainment selections comprises:
  determining one or more common genres represented by at least one of the first plurality of entertainment selections and at least one of the second plurality of entertainment selections; and
  selecting the third plurality of entertainment selections such that each of the third plurality of entertainment selections belongs to at least one of the common genres.

6. A program product for merging media, the program product comprising:
- a program configured to at least facilitate:
  - obtaining a first input from a first media device of a first user, the first media device comprising a first portable electronic device belong to a first occupant of a plurality of occupants of a vehicle, the first input comprising first data corresponding to properties of one or more first media files, the program configured to obtain metadata representative of a first plurality of entertainment selections from the first media device via a first physical input connection onboard the vehicle;
  - obtaining a second input from a second media device of a second user, the second media device comprising a second portable electronic device belong to a second occupant of the plurality of occupants of the vehicle, the second input comprising second data corresponding to properties of one or more second media files, the program configured to obtain metadata representative of a second plurality of entertainment selections from the second media device via a second physical input connection onboard the vehicle;
  - generating a list comprising:
    - one or more first selected media files of the first media files from the first media device sharing a common property with at least one of the second media files from the second media device; and
    - one or more second selected media files of the second media files from the second media device sharing the common property, such that the list comprises a selected plurality of files comprising the first selected media files and the second selected media files, wherein the list comprises a third plurality of entertainment selections and is generated using the metadata representative of the first plurality of entertainment selections and the metadata representative of the second plurality of entertainment selections; and
  - causing execution of one of the selected plurality of media files; and
- a non-transitory, computer readable medium storing the program.

7. The program product of claim 6, wherein the program is further configured to at least facilitate causing the first media device to execute one of the selected plurality of media files.

8. The program product of claim 6, wherein the program is further configured to at least facilitate:
- obtaining one or more additional inputs from one or more additional media devices, the one or more additional inputs comprising additional data corresponding to properties of one or more additional media files;
- generating the list so that the selected plurality of media files comprises:
  - one or more first selected media files of the first media files sharing the common property with at least one of the second media files and at least one of the additional media files of each of the additional media devices;
  - one or more second selected media files of the second media files sharing the common property; and
  - one or more additional selected media files of each of the additional media files sharing the common property; and
- causing one of the following:
  - execution of one of the first selected media files;
  - execution of one of the second selected media files; or
  - execution of one of the additional selected media files.

9. The program product of claim 6, wherein the program is further configured to at least facilitate:
- obtaining preferences of a first occupant of a plurality of occupants of a vehicle via the first media device onboard the vehicle;
- obtaining preferences of a second occupant of the plurality of occupants via the second media device onboard the vehicle; and
- generating the list to be compatible with the preferences of the first occupant and the preferences of the second occupant.

10. The program product of claim 6, wherein the program is further configured to at least facilitate:
- determining one or more common genres represented by at least one of the first plurality of entertainment selections and at least one of the second plurality of entertainment selections; and
- selecting the third plurality of entertainment selections such that each of the third plurality of entertainment selections belongs to at least one of the common genres.

11. A system for merging media, the system comprising:
- one or more input ports configured to at least facilitate:
  - obtaining a first input from a first media device of a first user, the first input comprising first data corresponding to properties of one or more first media files; and
  - obtaining a second input from a second media device of a second user, the second input comprising second data corresponding to properties of one or more second media files; and
- a processor coupled to the one or more input ports, the processor configured to at least facilitate:
  - generating a list comprising:
    - one or more first selected media files of the first media files from the first media device sharing a common property with at least one of the second media files from the first media device; and
    - one or more second selected media files of the second media files from the second media device sharing the common property, such that the list comprises a selected plurality of files comprising the first selected media files and the second selected media files; and
  - causing execution of one of the selected plurality of media files
- wherein:
  - the one or more input ports comprise:
    - a first input port that physically couples the first media device to the processor onboard the vehicle; and
    - a second input port that physically couples the second media device to the processor onboard the vehicle;
  - the one or more input ports are further configured to at least facilitate:
    - obtaining preferences of a first occupant of a plurality of occupants of a vehicle via the first media device onboard the vehicle; and
    - obtaining preferences of a second occupant of the plurality of occupants via the second media device onboard the vehicle; and
  - the processor is further configured to at least facilitate generating the list to be compatible with the preferences of the first occupant and the preferences of the second occupant.

12. The system of claim 11, wherein the processor is further configured to at least facilitate causing the first media device to execute one of the selected plurality of media files.

13. The system of claim 11, wherein:
the one or more input ports are further configured to at least facilitate obtaining one or more additional inputs from one or more additional media devices, the one or more additional inputs comprising additional data corresponding to properties of one or more additional media files; and
the processor is further configured to at least facilitate:
generating the list so that the selected plurality of media files comprises:
one or more first selected media files of the first media files sharing the common property with at least one of the second media files and at least one of the additional media files of each of the additional media devices;
one or more second selected media files of the second media files sharing the common property; and
one or more additional selected media files of each of the additional media files sharing the common property; and
causing one of the following:
execution of one of the first selected media files;
execution of one of the second selected media files; or
execution of one of additional selected media files.

14. The system of claim 11, wherein the processor is further configured to at least facilitate:
determining one or more common genres represented by at least one of the first plurality of entertainment selections and at least one of the second plurality of entertainment selections; and
selecting the third plurality of entertainment selections such that each of the third plurality of entertainment selections belongs to at least one of the common genres.

* * * * *